United States Patent
Geers

(10) Patent No.: US 7,313,118 B2
(45) Date of Patent: Dec. 25, 2007

(54) METHOD AND ARRANGEMENT FOR ASYNCHRONOUS PROCESSING OF CCTRCH DATA

(75) Inventor: Steven Nicholas Geers, Tetbury (GB)

(73) Assignee: IPWireless, Inc., San Bruno, CA (US)

( * ) Notice: Subject to any disclaimer, the term of this patent is extended or adjusted under 35 U.S.C. 154(b) by 912 days.

(21) Appl. No.: 10/274,806

(22) Filed: Oct. 21, 2002

(65) Prior Publication Data
US 2003/0152043 A1    Aug. 14, 2003

(30) Foreign Application Priority Data
Oct. 19, 2001    (GB) ................................ 0125153.7

(51) Int. Cl.
*H04B 7/212*    (2006.01)

(52) U.S. Cl. ........................ 370/337; 370/412; 370/429

(58) Field of Classification Search ................ 370/337, 370/335, 329, 330, 215, 429, 336, 347, 442, 370/412; 455/561; 375/341
See application file for complete search history.

(56) References Cited

U.S. PATENT DOCUMENTS 5,862,189 A    1/1999  Huisken et al. ............. 375/341
2003/0035394 A1*  2/2003  Zeira et al. .................. 370/335
2003/0099217 A1*  5/2003  Castor et al. ................ 370/335
2004/0246891 A1* 12/2004  Kay et al. .................... 370/215

FOREIGN PATENT DOCUMENTS

| EP | 0758168 | 2/1997 |
|----|---------|--------|
| EP | 0998052 | 5/2000 |
| WO | WO-0221715 | 3/2002 |

OTHER PUBLICATIONS

International Search Report mailed on Feb. 5, 2003 for PCT Application No. PCT/GB02/04731, filed Oct. 21, 2002, three pages.

* cited by examiner

*Primary Examiner*—John Pezzlo
(74) *Attorney, Agent, or Firm*—Morrison & Foerster LLP

(57) ABSTRACT

A method and arrangement for processing of CCTrCH data in a UMTS system, by: receiving CCTrCH data across a plurality of radio frames and timeslots (310); storing the received CCTrCH data (320); and upon receipt of complete data for a CCTrCH, processing the stored CCTrCH data through channel processing asynchronously to the received timeslot structure (360). Preferably, the received CCTrCH data is stored in a single RAM memory in link-list form, whereby each timeslot of received CCTrCH data can be independently accessed in the memory. This method of buffering the different parts of the received CCTrCH data, so that they can be recombined before the TrCH decoding and de-multiplexing, is both memory efficient and spreads out the processing load over time.

15 Claims, 6 Drawing Sheets

US 7,313,118 B2

METHOD AND ARRANGEMENT FOR ASYNCHRONOUS PROCESSING OF CCTRCH DATA

FIELD OF THE INVENTION

This invention relates to Universal Mobile Telecommunication Systems (UMTS), and particularly to decoding and de-multiplexing in such systems.

BACKGROUND OF THE INVENTION

In the field of this invention it is known that, in UMTS Terrestrial Radio Access (UTRA) Time Division Duplex (TDD) mode, Coded Composite Transport Channel (CCTrCH) data is can be split across multiple timeslots in consecutive Radio Frames. This is determined by the Transmission Time Interval (TTI), which is typically 10, 20, 40, 80 ms, or 1, 2, 4, 8 Radio Frames.

As an UTRA system is packet based the data received which needs to be processed is non-deterministic in size and in frequency. Therefore to store and process the data efficiently a scheme is required that can buffer and process this data effectively.

Heretofore, schemes used for CCTrCH processing have had the disadvantage of compromised efficiency since they do not efficiently store the data prior to processing and they do not take advantage of the fact that not all the timeslots in a radio frame are used to receive data.

A need therefore exists for processing of CCTrCH data wherein the abovementioned disadvantage(s) may be alleviated.

STATEMENT OF INVENTION

In accordance with a first aspect of the present invention there is provided a method for processing of CCTrCH data in a UMTS system, comprising the steps of:
  receiving CCTrCH data across a plurality of timeslots;
  storing the received CCTrCH data; and
  upon receipt of complete data for a CCTrCH, processing the stored CCTrCH data through channel processing asynchronously to individual received timeslots.

In accordance with a second aspect of the present invention there is provided an arrangement for processing of CCTrCH data in a UMTS system, comprising:
  means for receiving CCTrCH data across a plurality of timeslots;
  means for storing the received CCTrCH data; and
  means for, upon receipt of complete data for a CCTrCH, processing the stored CCTrCH data through channel processing asynchronously to individual received timeslots.

The arrangement may be comprised in user equipment for use in a UMTS system.

The arrangement may alternatively be comprised in a base station for use in a UMTS system.

In essence, the invention is based in part on the idea of processing the CCTrCH data asynchronously to the timeslot structure rather than processing each CCTrCH in the timeslot in which it was received. This has the advantage of increasing the amount of time available to process the CCTrCH as not all timeslots in a frame are receive timeslots (whereas if each CCTrCH is processed in the individual timeslot it is received then the processing time associated with transmit timeslots is not used).

BRIEF DESCRIPTION OF THE DRAWINGS

One method and arrangement for asynchronous processing of CCTrCH data incorporating the present invention will now be described, by way of example only, with reference to the accompanying drawing(s), in which.

DESCRIPTION OF PREFERRED EMBODIMENT

Figure 1:
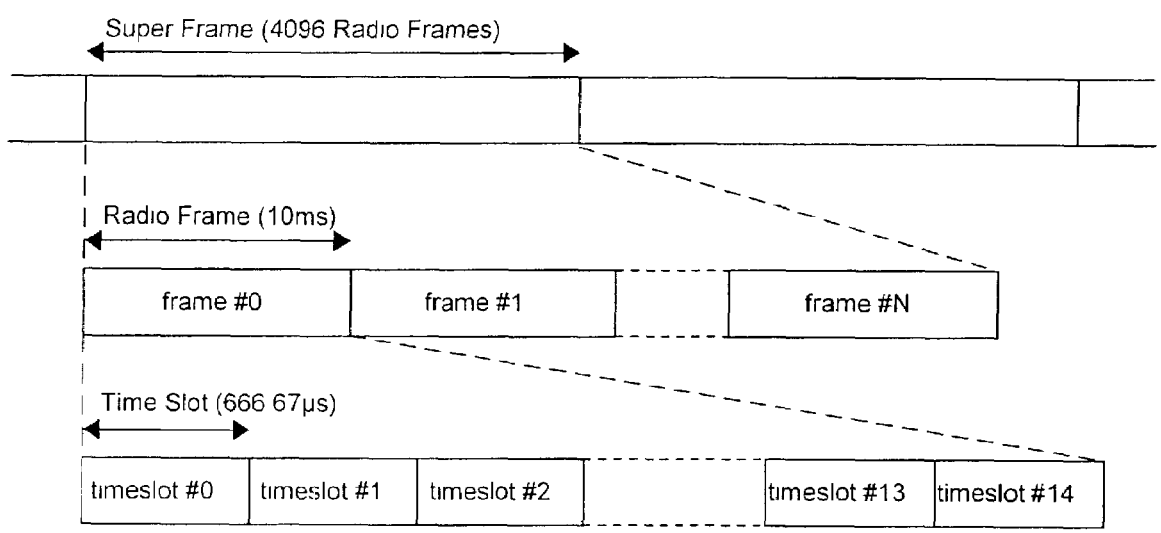
FIG. 1 shows a block schematic diagram illustrating time domain UTRA framing.

In a UMTS Terrestrial Radio Access Network (UTRAN) there are two modes of operation: UTRA Frequency Division Duplex (FDD) and UTRA Time Division Duplex (TDD). In UTRA TDD users are separated in both the code domain and time domain. In the time domain employed in UTRA framing, illustrated in FIG. 1, 4096 radio frames make up a super frame with each radio frame consisting of 15 timeslots. A timeslot can be allocated to either Uplink (UL) or Downlink (DL) transmission.

In a typical TDD system the UL and DL transmissions have to be synchronized to reduce interference. In addition DL broadcast signaling and UL random access signaling has to be supported. This leads to a possible partitioning of the radio frame as shown below:

| 0 | 1 | 2 | 3 | 4 | 5 | 6 | 7 | 8 | 9 | 10 | 11 | 12 | 13 | 14 |
|---|---|---|---|---|---|---|---|---|---|----|----|----|----|----|
| DL | DL | DL | DL | DL | DL | DL | DL | UL | UL | UL | UL | UL | UL | UL |

Figure 2:
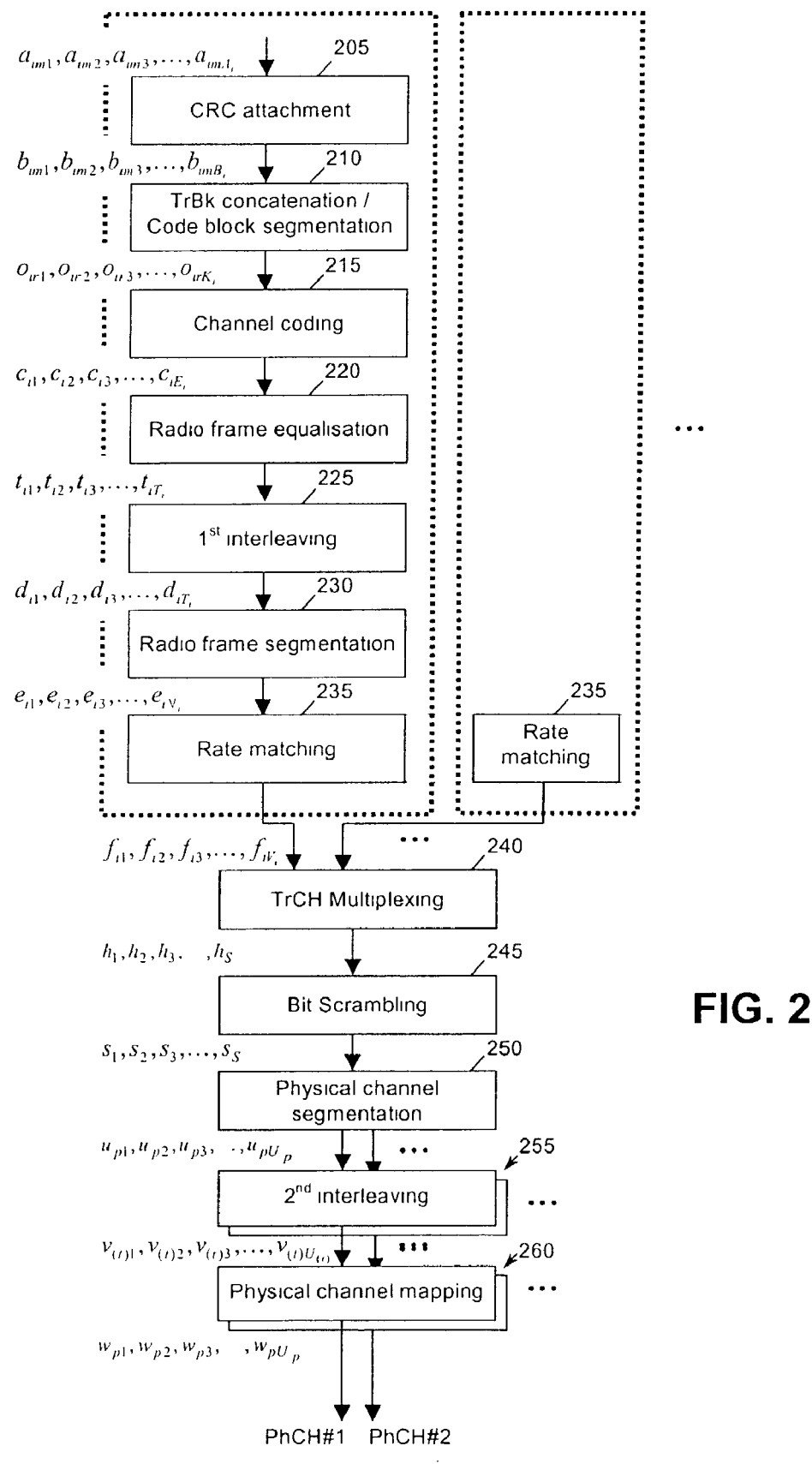
FIG. 2 shows a block schematic diagram illustrating multiplexing and channel coding in UTRA.

UTRA specifies the processing that is applied to the Transport Channel (TrCH) data by Layer 1 (L1), as shown in FIG. 2.

Transport Blocks (blocks of a defined number of bits) are submitted by the media access control (MAC) to L1 for processing. A Transport Block typically corresponds to a MAC protocol data unit (PDU) or corresponding unit. Layer 1 processes each Transport Block as shown in FIG. 2 to build up CCTrCHs. Firstly, cyclic redundancy check (CRC) attachment is performed at 205; then, transport block (TrBk) concatenation/code block segmentation is performed at 210. Next, channel coding is performed at 215; then, radio frame equalisation is performed at 220. Next, first interleaving is performed at 225; then, radio frame segmentation is performed at 230, and rate matching is performed at 235. A number of rate-matched data streams are multiplexed together on a single transport channel at 240; then, the resultant multiplexed data stream is processed by bit scrambling at 245. The bit-scrambled data stream is segmented into a number of physical channels at 250; then, second interleaving is performed on each of the segmented physical channel data streams at 255. Finally, physical channel mapping is performed at 260 to produce a number of CCTrCHs for physical channels such as PhCH#1 and PhCH#2. These CCTrCHs are mapped onto timeslots in known manner.

Each CCTrCH can be split across multiple timeslots in consecutive Radio Frames. This is determined by the Transmission Time Interval (TTI), which is typically 10, 20, 40, 80 ms or 1, 2, 4, 8 Radio Frames.

As a UTRA system is packet based the data received which needs to be processed is non-deterministic in size and in frequency. Therefore to store and process the data efficiently an architecture is required that can buffer and process this data effectively. The maximum throughput for the CCTrCH processing is fixed for a particular system; however the number, size and frequency of CCTrCHs that are processed are dynamically allocated. The storage and processing strategy must therefore be flexible to efficiently process the data.

Since the CCTrCH received have different TTI periods and can be allocated to different timeslots in a Radio frame, timeslots of data for different CCTrCH are received interleaved with each other. This means that the receiver has to recombine and re-order the received data into the CCTrCHs that were sent, before they can be processed by the TrCH decoder and de-multiplexing process.

Heretofore, schemes used for CCTrCH processing have had the disadvantage of compromised efficiency, such as by use of a dedicated buffer per CCTrCH (in this case each buffer needs to be sized for the largest CCTrCH that can be received, requiring a large amount of redundant memory).

As referred to above, the present invention is based in part on the idea of processing the CCTrCH data asynchronously to the timeslot structure rather than processing each CCTrCH in the timeslot in which it was received. This has the advantage of increasing the amount of time available to process the CCTrCH as not all timeslots in a frame are receive timeslots (whereas if each CCTrCH is processed in the individual timeslot it is received then the processing time associated with transmit timeslots is not used).

Asynchronous Processing Overview

Figure 3:
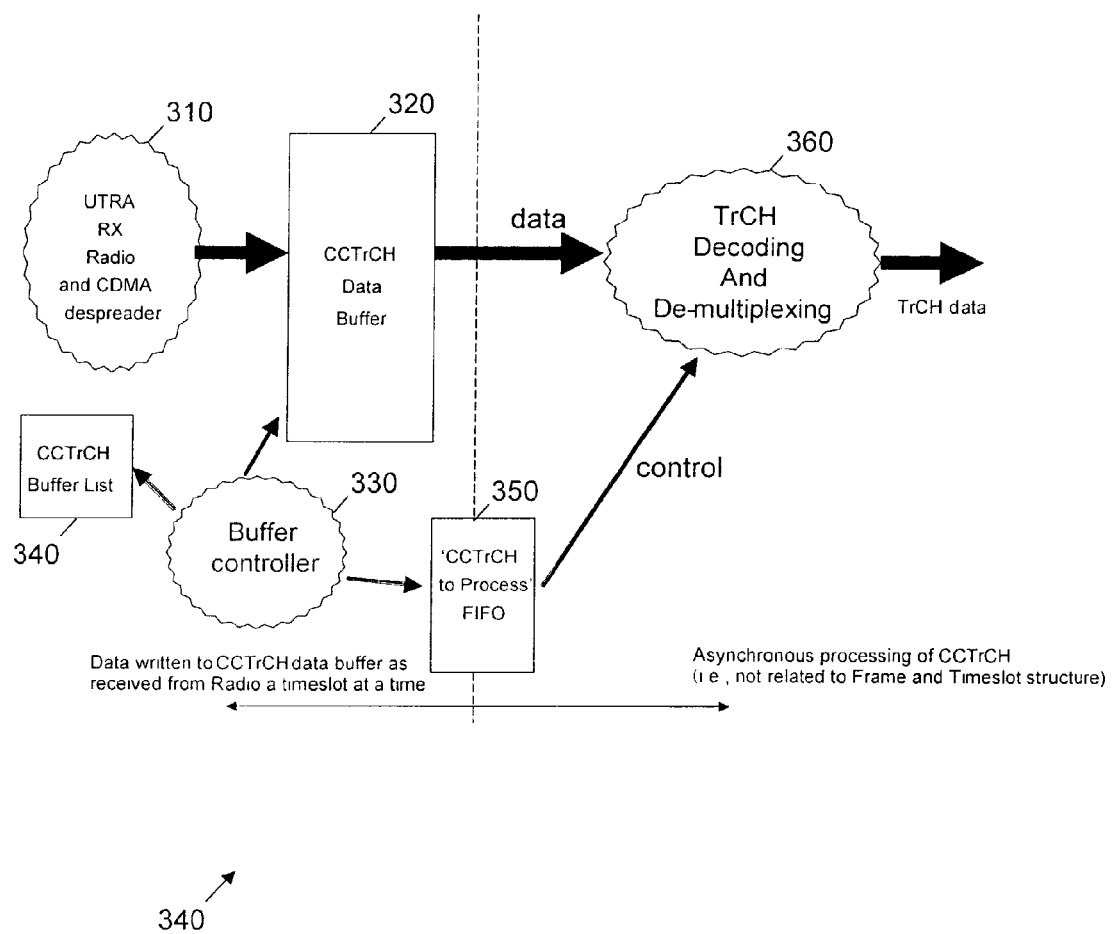
FIG. 3 shows a block schematic diagram illustrating an arrangement for buffering and control of CCTrCH incorporating the present invention.

FIG. 3 shows the block diagram of a proposed arrangement 300 to buffer and process the CCTrCH data with improved efficiency. Data is received from a radio unit as it is de-spread by the front end of the detection process 310. This is synchronous to the timeslot and frame structure in a UTRA TDD system. The way the data for each CCTrCH is stored in buffer 320, under control of a buffer controller 330, will be described below in greater detail.

The data for a CCTrCH can be split over Radio Frames and timeslots within the Radio Frame. As each 'timeslot worth' of data is received it is buffered in the RAM of the CCTrCH data buffer 320 in the order that it is received in such a way that the data for each CCTrCH is associated together; this is achieved by use of a 'linked-list' scheme, the start of each 'linked-list' in the data buffer 320 being added to the buffer list 340. Once all the data for one CCTrCH has been received, an indication of this CCTrCH is added to a 'CCTrCH to Process' FIFO buffer 350. The FIFO 350 acts as a queue of CCTrCHs that need to be processed by the TrCH decoding and de-multiplexing process 360. The TrCH decoding and de-multiplexing process can then process the received CCTrCHs that are indicated in the FIFO asynchronously to the timeslot structure. Once the CCTrCH has been processed, the area in the buffer RAM that this CCTrCH occupied can be reused by another CCTrCH.

CCTrCH Buffer RAM Structure

The CCTrCH data buffer RAM format must be flexible enough to allow different CCTrCHs of different sizes and different numbers of timeslots to be stored efficiently. For this reason a single RAM was chosen and the CCTrCH data is stored using a link-list format. Due to the packet based nature of the received CCTrCH data, the data associated with each CCTrCH will not be sequential in the CCTrCH buffer RAM. However, the link-list approach allows all the data in each CCTrCH to be linked together.

Figure 4:
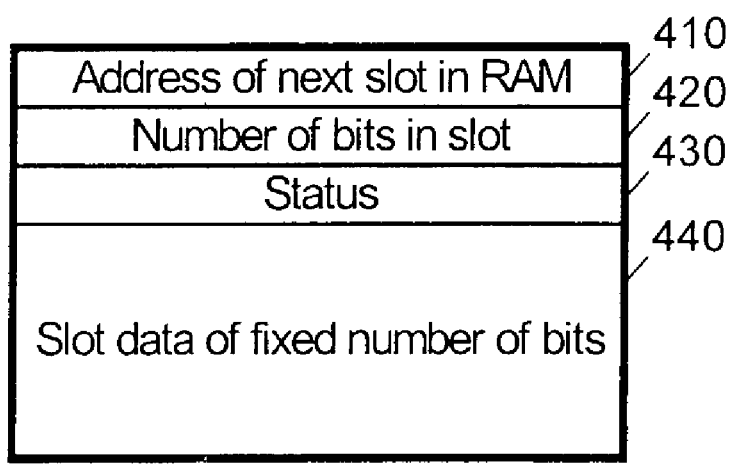
FIG. 4 shows a block schematic diagram illustrating a RAM arrangement split up into "slots" of data, as used in the arrangement of FIG. 3.

The RAM is split up into "slots" of data of the format shown in FIG. 4. This consists of three header fields: address of next slot 410, Number of bits in slot 420 and status 430.

The amount of data 440 in the slot is chosen to be a common multiple of the amount of data that could be received in a timeslot per CCTrCH. A CCTrCH with more data can be stored in the RAM by using multiple slots. The 'number of bits in slot' header field 420 allows for the fact that the amount of data in a CCTrCH might not be an integer multiple of the slot size.

The status field 430 is used to store such information as whether or not the slot is available for use and whether or not it is the last slot in the 'linked-list' for the CCTrCH buffer.

A separate list 340 is kept of the first slot in each CCTrCH that is stored in the RAM. This is termed the CCTrCH buffer list and is used to identify each CCTrCH that is in the CCTrCH buffer RAM. The CCTrCH buffer is assigned a CCTRCH ID at this point. This ID can be used to identify each CCTrCH in the CCTrCH buffer RAM 320.

CCTrCH data is added to the buffer RAM by finding the next available slot in the RAM. The address of the next slot in the RAM is updated dynamically as a link list to point to the next slot in the RAM for that CCTrCH. Thus by finding the first slot in the RAM for a CCTrCH from the CCTrCH buffer list it is possible to trace the slots for that CCTrCH through the CCTrCH buffer RAM.

Figure 5:
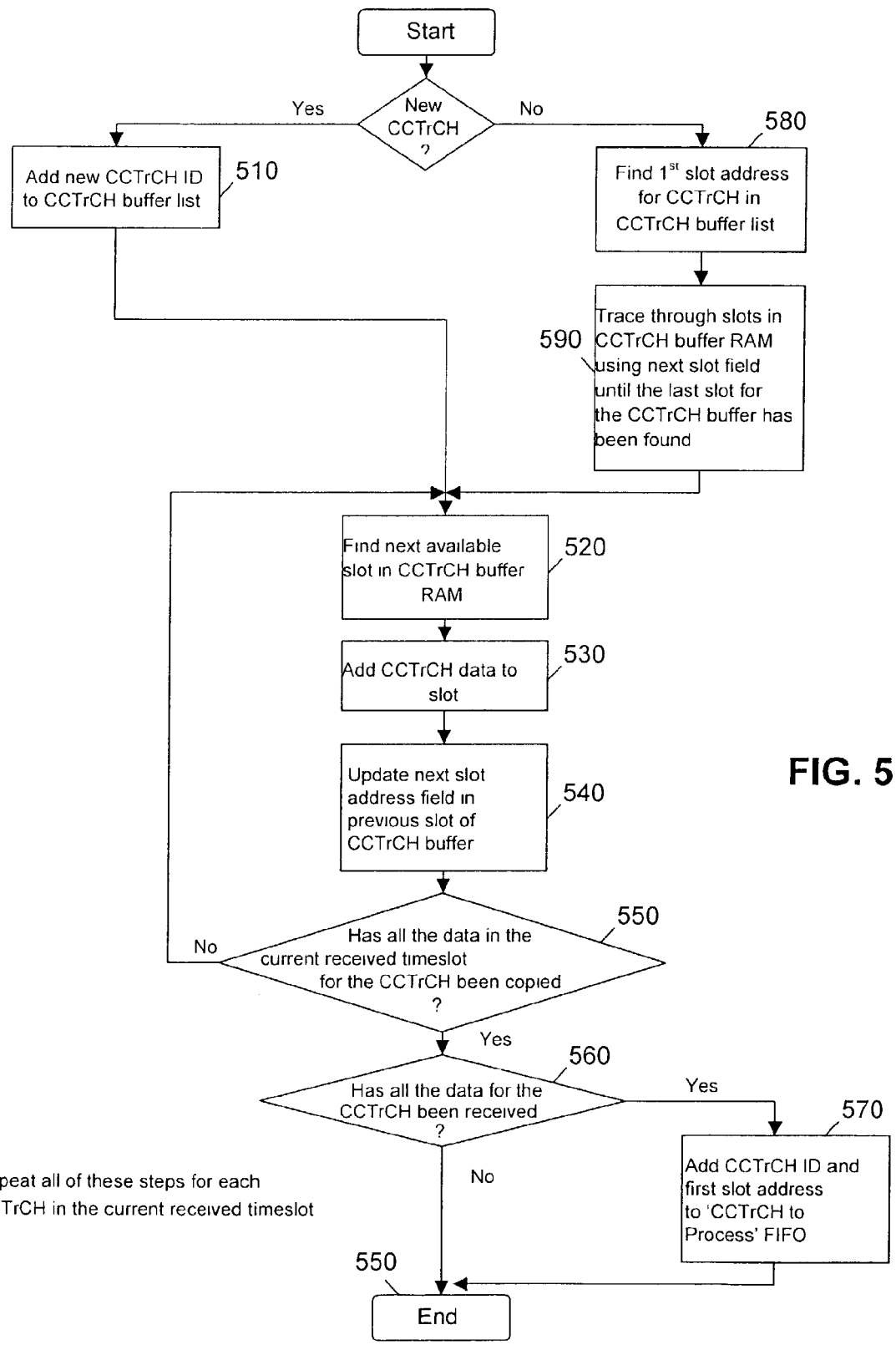
FIG. 5 shows a flowchart illustrating CCTrCH buffer controller flow, as used in the arrangement of FIG. 3.

Referring now also to the flowchart of FIG. 5, which illustrates how the buffer controller works, CCTrCH data is added to the CCTrCH buffer RAM as follows:

1. A new CCTrCH. If the data received is for a new CCTrCH then the address of the first available slot in the CCTrCH RAM is added to the CCTrCH buffer list as a new CCTrCH buffer and assigned a CCTrCH ID, as shown at 510. The CCTrCH data received is added to slots one at a time, until all the data has been added to the buffer RAM. This is achieved by find the next available slot in the CCTrCH buffer RAM 320 (as shown at 520), and adding CCTrCH data to the slot (as shown at 530). As each slot is used the address of the next slot is added in the appropriate field (as shown at 540). This process is continued (as shown at 550) until all the data in the current received timeslot for the CCTrCH been copied. When all the data for the CCTrCH been received (as shown at 560), the CCTrCH ID and first slot address are added to the to 'CCTrCH to Process' FIFO 360 (as shown at 570).

2. An existing CCTrCH. The first slot in the CCTrCH is found from the CCTrCH buffer list 340 (as shown at 580). The slots already received for the CCTrCH are traced through the CCTrCH buffer RAM to find the last slot in the RAM for this CCTrCH (as shown at 590). The next slot field can then be updated with the next available slot address (as shown at 520), and the CCTrCH data received is added to available slots one at a time until all the data has been added to the buffer RAM (as shown at 530). As each slot is used, the address of the next slot is added in the appropriate field (as shown at 540).

An improvement would be in addition to store the address of the last slot in the 'linked-list' in the CCTrCH buffer list 340. This means that to add new CCTrCH data to the 'linked-list' the last slot address of the data already in the ram can be read directly from the CCTrCH buffer list 340 and the 'linked-list' would not need to be traced through the RAM to find the last slot address.

When all the data for a CCTrCH has been added to the CCTrCH buffer RAM, then the CCTrCH data can be processed by the TrCH decoder and de-multiplexing processing. This is indicated by adding the address of the first slot in the CCTrCH buffer RAM into the 'CCTrCH to Process' FIFO along with its CCTrCH ID (as shown at 570).

When the CCTrCH has been processed, the slots in the RAM that are used to store the CCTrCH data can be de-allocated. This allows the slots to be reused for other CCTrCHs.

Asynchronous TrCH Processing

Once all the data for a CCTrCH has been received, the TrCH decoding and de-multiplexing processing can begin. This processing can be carried out asynchronously to the timeslot structure. This has the advantage of spreading the processing over the whole of the radio frame and thus allowing more time for the data to be processed.

The TrCH processing waits for a valid CCTrCH ID to be added by the buffer controller to the 'CCTrCH to Process' FIFO. This indicates that there is a complete CCTrCH of data to process.

The TrCH processing can then read the CCTrCH slot by slot from the CCTrCH data buffer by following the link list through the RAM. When the data has been processed, the TrCH processor signals back to the buffer controller via another FIFO that the slots in the RAM that the CCTrCH uses can be freed up for use by another CCTrCH.

Figure 6:
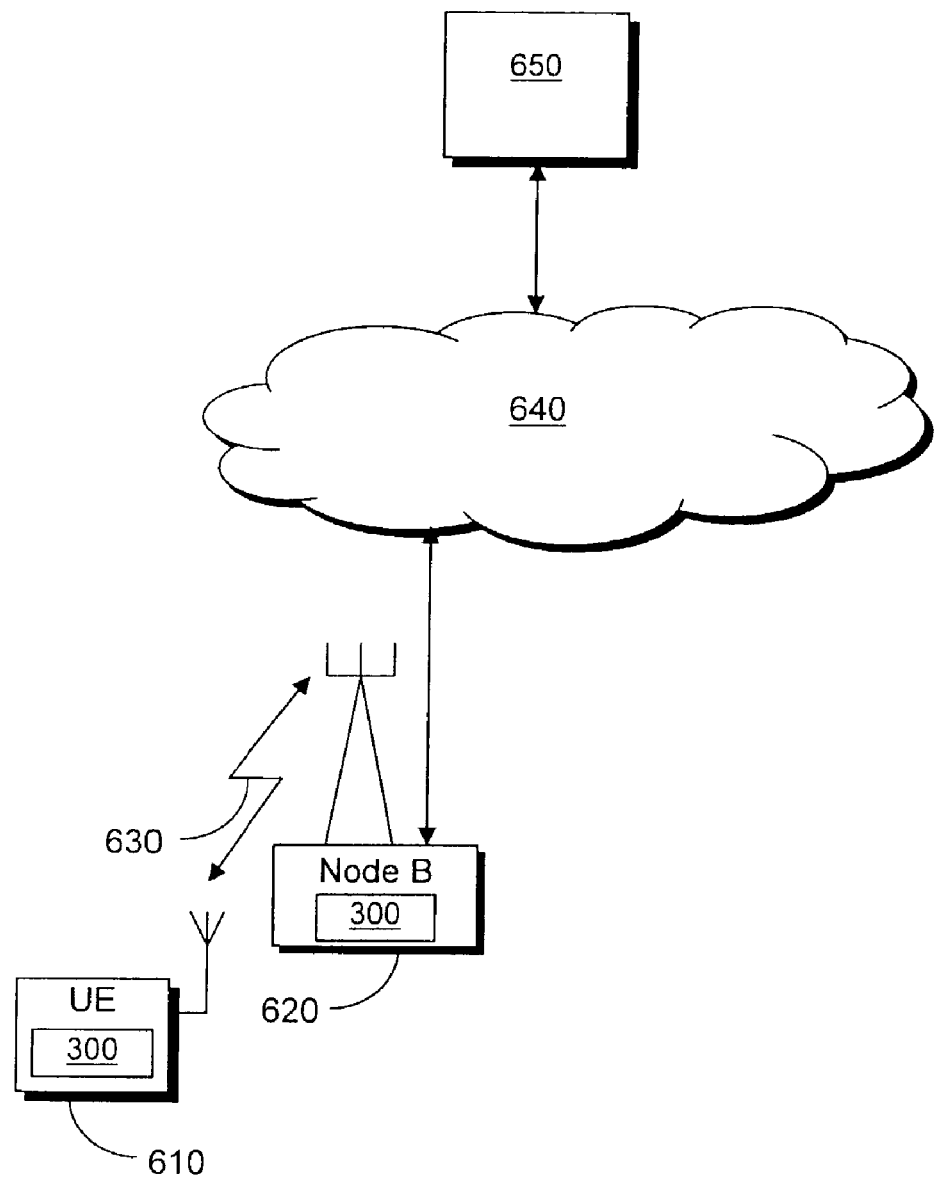
FIG. 6 shows a block-schematic diagram of a UMTS system in which the invention is used.

Referring now also to FIG. 6, a UMTS system 600 includes a user terminal 610 (commonly referred to as 'User Equipment') which communicates over a CDMA radio link with a base station 630 (commonly referred to as a 'Node B'). The Node B 630 is controlled by a radio network controller 640, which communicates with other system infrastructure shown collectively as 650. Such a system (insofar as it has been described up to this point) is well known and need not be described further. However, it will be understood that the arrangement 300 described above for buffering and control of CCTrCH may be advantageously implemented in either a UE 610 or a Node B 630 of the system as shown in the figure.

It will be appreciated that the method described above for buffering and control of CCTrCH may be carried out in software running on a processor (not shown), and that the software may be provided as a computer program element carried on any suitable data carrier (also not shown) such as a magnetic or optical computer disc.

It will be also be appreciated that the method described above for buffering and control of CCTrCH may alternatively be carried out in hardware, for example in the form of an integrated circuit (not shown) such as an FPGA (Field Programmable Gate Array) or ASIC (Application Specific Integrated Integrated Circuit).

In conclusion, therefore, it will be understood that the asynchronous processing of CCTrCH data described above provides an efficient scheme for buffering the received data from the radio and asynchronously processing the CCTrCH in a way that is both memory efficient and spreads out the processing load over time.

The invention claimed is:

1. A method for processing of physical data information related to Coded Composite Transport Channels (CCTrCH) in a UMTS system, the method comprising:
   receiving physical data information across a plurality of timeslots;
   storing the received physical data information in a memory in an associated data scheme, wherein the associated data scheme allows each timeslot of received physical data information to be independently accessed in the memory; and
   upon receipt of complete data for a CCTrCH, processing the stored physical data information through channel processing asynchronously to individual received timeslots.

2. The method of claim 1, wherein the associated data scheme is in a linked-list form.

3. The method of claim 2, wherein storing the received physical data information comprises storing each timeslot of received physical data information in the form of a memory slot having a header portion and a data portion, the header portion including an indication of the address in the memory of the next time slot of data.

4. The method of claim 3 wherein the header portion also includes an indication of the number of bits of physical data information in the timeslot.

5. The method of claim 3 wherein the header portion also includes an indication of the status of the memory slot.

6. The method of claim 1, wherein processing comprises storing in a buffer an indication of the CCTrCH for which complete data has been received.

7. A user equipment (UE) for processing physical data information related to Coded Composite Transport Channels (CCTrCH) in a Universal Mobile Telecommunication System (UMTS), comprising:
   means for receiving physical data information across a plurality of timeslots;
   a buffer for storing the received physical data information in a memory in an associated data scheme, wherein the associated data scheme allows each timeslot of received physical data information to be independently accessed in the memory; and
   means for, upon receipt of complete data for a CCTrCH, processing the stored physical data information through channel processing asynchronously to individual received timeslots.

8. The UE of claim 7, wherein the associated data scheme is in a linked-list form.

9. The UE of claim 8, wherein the buffer for storing the received physical data information comprises means for storing each timeslot of received physical data information in the form of a memory slot having a header portion and a data portion, the header portion including an indication of the address in the memory of the next timeslot of data.

10. The UE of claim 9, wherein the header portion includes an indication of the number of bits of physical data information in the timeslot.

11. The UE of claim 9, wherein the header portion includes an indication of the status of the memory slot.

12. The UE of claim 7, wherein the means for processing comprises a buffer for storing an indication of the CCTrCH for which complete data has been received.

13. A base station for processing physical data information related to Coded Composite Transport Channels in a Universal Mobile Telecommunication System , the base station comprising:

means for receiving physical data information across a plurality of timeslots;

a buffer for storing the received physical data information in a memory in an associated data scheme, wherein the associated data scheme allows each timeslot of received physical data information to be independently accessed in the memory; and means for, upon receipt of complete data for a CCTrCH, processing the stored physical data information through channel processing asynchronously to individual received timeslots.

14. A computer-readable medium executable on a computer comprising program code for performing a method for processing physical data information related to Coded Composite Transport Channels (CCTrCH) in a UMTS system, the method comprising:

receiving physical data information across a plurality of timeslots;

storing the received physical data information in a memory in an associated data scheme, wherein the associated data scheme allows each timeslot of received physical data information to be independently accessed in the memory; and upon receipt of complete data for a CCTrCH, processing the stored physical data information through channel processing asynchronously to individual received timeslots.

15. An integrated circuit for processing physical data information related to Coded Composite Transport Channels (CCTrCH) in a Universal Mobile Telecommunication System (UMTS), the integrated circuit comprising:

means for receiving physical data information across a plurality of timeslots;

a buffer for storing the received physical data information in a memory in an associated data scheme, wherein the associated data scheme allows each timeslot of received physical data information to be independently accessed in the memory; and means for, upon receipt of complete data for a CCTrCH, processing the stored physical data information through channel processing asynchronously to individual received timeslots.

* * * * *

UNITED STATES PATENT AND TRADEMARK OFFICE
CERTIFICATE OF CORRECTION

| | | |
|---|---|---|
| PATENT NO. | : 7,313,118 B2 | Page 1 of 1 |
| APPLICATION NO. | : 10/274806 | |
| DATED | : December 25, 2007 | |
| INVENTOR(S) | : Steven N. Geers | |

It is certified that error appears in the above-identified patent and that said Letters Patent is hereby corrected as shown below:

Column 6, Claim 3, Line 23, delete "time slot" and insert --timeslot--.

Column 6, Claim 13, Line 65, delete "Coded Composite Transport Channels" and insert --Coded Composite Transport Channels (CCTrCH)--.

Column 6, Claim 13, Line 66, delete "Universal Mobile Telecommunication System  ," and insert --Universal Mobile Telecommunication System (UMTS),--.

Signed and Sealed this

Twenty-second Day of September, 2009

David J. Kappos
*Director of the United States Patent and Trademark Office*